(12) United States Patent
Vaniglia

(10) Patent No.: US 8,613,302 B2
(45) Date of Patent: Dec. 24, 2013

(54) REVERSING FIBER PLACEMENT HEAD

(75) Inventor: Milo M. Vaniglia, Cold Spring, KY (US)

(73) Assignee: Fives Machining Systems, Inc., Fond Du Lac, WI (US)

( * ) Notice: Subject to any disclaimer, the term of this patent is extended or adjusted under 35 U.S.C. 154(b) by 365 days.

(21) Appl. No.: 13/038,913

(22) Filed: Mar. 2, 2011

(65) Prior Publication Data
US 2012/0222810 A1    Sep. 6, 2012

(51) Int. Cl.
*B29C 70/38*    (2006.01)

(52) U.S. Cl.
USPC ............ 156/433; 156/441; 156/523; 156/573

(58) Field of Classification Search
USPC .................................. 156/433, 441, 523, 573
See application file for complete search history.

(56) References Cited

U.S. PATENT DOCUMENTS

| | | | | |
|---|---|---|---|---|
| 4,234,374 A | * | 11/1980 | Frank ............................. | 156/459 |
| 4,259,144 A | * | 3/1981 | Ballentine ..................... | 156/522 |
| 4,285,752 A | | 8/1981 | Higgins | |
| 4,699,683 A | | 10/1987 | McCowin | |
| 4,869,774 A | | 9/1989 | Wisbey | |
| 4,872,619 A | | 10/1989 | Vaniglia | |
| 4,877,193 A | | 10/1989 | Vaniglia | |
| 4,943,338 A | | 7/1990 | Wisbey | |
| 5,045,147 A | * | 9/1991 | Benson et al. ................ | 156/429 |
| 5,110,395 A | | 5/1992 | Vaniglia | |
| 5,273,614 A | | 12/1993 | Grimshaw et al. | |
| 5,979,531 A | * | 11/1999 | Barr et al. ..................... | 156/574 |
| 6,096,164 A | | 8/2000 | Benson et al. | |
| 6,112,792 A | | 9/2000 | Barr et al. | |
| 7,353,853 B2 | | 4/2008 | Borgmann et al. | |
| 7,422,647 B2 | | 9/2008 | Clark et al. | |
| 7,467,782 B2 | | 12/2008 | Harvey et al. | |
| 7,591,294 B2 | | 9/2009 | Wampler et al. | |
| 7,717,151 B2 | | 5/2010 | Wampler et al. | |
| 2005/0061422 A1 | * | 3/2005 | Martin ........................... | 156/230 |
| 2010/0024952 A1 | | 2/2010 | Wampler et al. | |

FOREIGN PATENT DOCUMENTS

| | | |
|---|---|---|
| DE | 4004720 A1 | 8/1991 |
| EP | 0534092 A1 | 3/1993 |
| FR | 2865156 A1 | 7/2005 |

OTHER PUBLICATIONS

Machine translation of French Patent 2865156, date unknown.*
European Search Report EP 12155879; Dated Jul. 22, 2013; 6 pages.

* cited by examiner

*Primary Examiner* — Jeff Aftergut

(74) *Attorney, Agent, or Firm* — Reising Ethington P.C.

(57) ABSTRACT

A reversing fiber placement head that is capable of bidirectional fiber placement on an application surface includes a feed mechanism for delivering fiber along two feed paths that are in a V-shaped orientation relative to one another. A pressure tip assembly including a compaction roller receives fiber from the two feed paths and applies the fiber to an application surface. A shifting mechanism shifts the pressure tip assembly from a first position on the fiber placement head to a second position on the fiber placement head to move the compaction roller along a linear path relative to the fiber placement head, allowing the compaction roller to change its direction of rotation in order to apply fiber to the application surface in opposite directions.

11 Claims, 4 Drawing Sheets

REVERSING FIBER PLACEMENT HEAD

FIELD

A fiber placement head is capable of bi-directional fiber placement on an application surface without requiring the head to rotate 180° in order to apply fiber when traveling in opposite directions.

BACKGROUND

Known fiber placement machines use a compaction roller to press fiber material onto an application surface. The compaction roller traverses the surface, for example, from the left edge to the right edge, then lifts off of the surface, performs a 180 degree change of direction, is placed back into contact with the surface, and then moves from the right edge back to the left edge. For the purpose of illustration, if the bottom of the fiber that is pressed into contact with the mold is black when the head travels from the left to the right side of the mold, and the top of the fiber is white, when the head travels in the opposite direction from right to left, it is still the black bottom of the fiber that is pressed into contact with mold, and the white top of the fiber that is on top. Material layup time is increased because the head has to perform a 180 degree rotation in order to reverse direction, and the fiber delivery path from the wrist that supports the head to the compaction roller is complicated because the 180 degree rotation of the head at the end of every course twists the fiber delivery path through the wrist and causes dramatic changes in the path length.

SUMMARY OF THE DEVICE

A compaction roller in a fiber placement head reverses direction from left to right, and then from right to left, without requiring the head to perform a 180 degree rotation. In so doing, and using the same illustrative example given above, the black side of the fiber is pressed onto the mold surface with the head moving in one direction, but because the head does not perform a 180 degree rotation, the white side of the fiber is pressed onto the mold surface with the head moving in the opposite direction. Material layup time is reduced because the head does not have to perform a 180 degree rotation in order to reverse direction, and the fiber path from the wrist to the compaction roller is simplified because there is no head rotation. The head uses a linear side swap roller that is capable of bi-directional fiber placement on the application surface without requiring the head to rotate 180° in order to apply fiber in the opposite direction.

DETAILED DESCRIPTION

Figure 1:
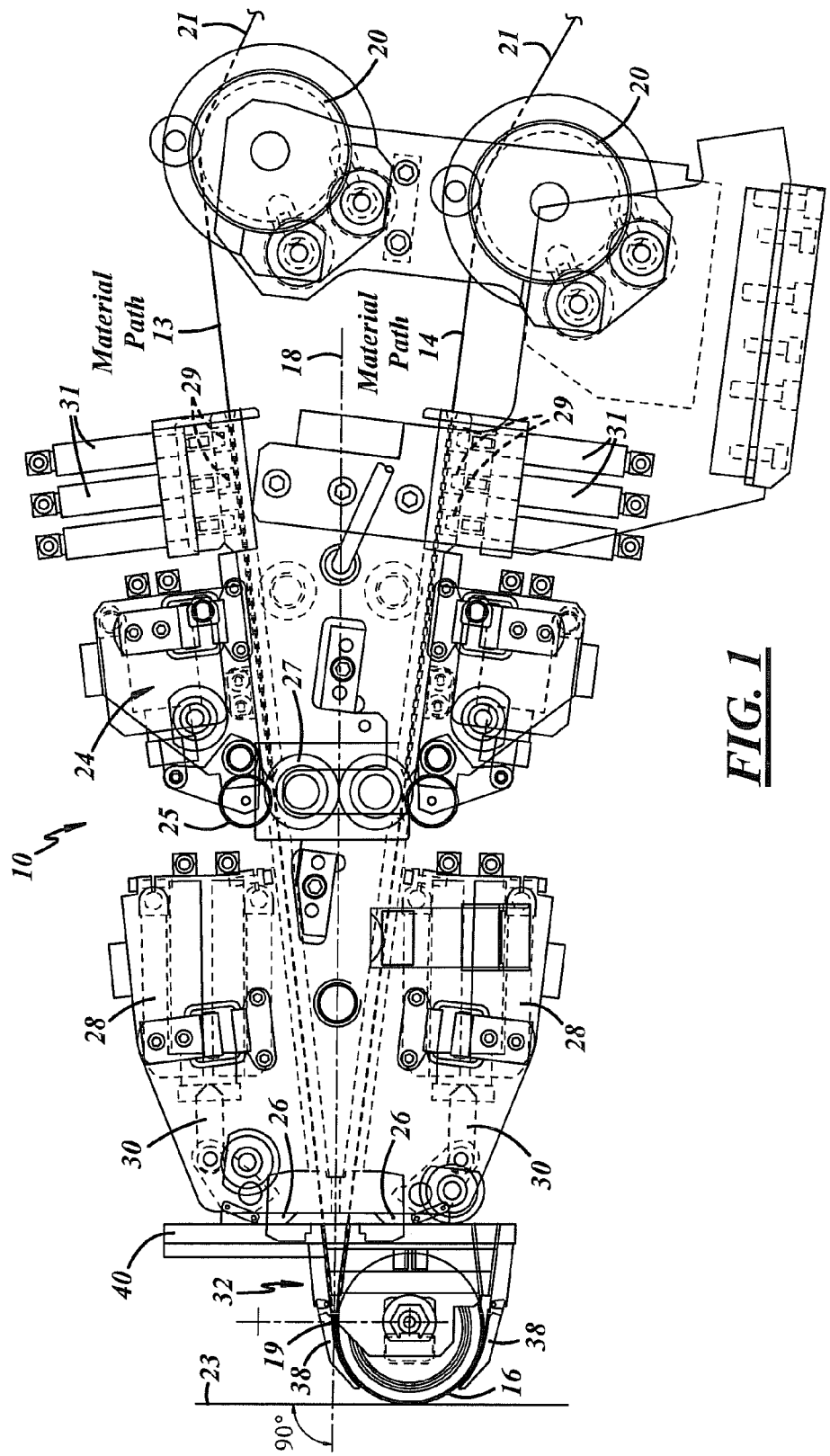
FIG. 1 is a side view of a fiber placement head.

Turning now to FIG. 1, a fiber placement head is generally designated by the reference numeral 10. The fiber placement head as shown has a material delivery path comprising number of upper odd numbered lanes 13 and a number of lower even numbered lanes 14 for material delivery that merge together at the compaction roller 16 to form a continuous web of material. The odd/even material paths 13,14 extend from the redirect rollers 20 that receive fiber 21 from a material delivery system within the head to the compaction roller 16. The odd/even material paths 13,14 form a "V" that is symmetrical about the centerline 18 of the head and is a straight path from the redirect rollers 20 to the initial point of contact 19 with the compaction roller 16. The centerline 18 of the head is perpendicular to the application surface 23, and tangent to either side of the compaction roller 16 depending on which side of the head 10 the roller is positioned as more fully explained below. Although only two redirect rollers 20 and two material delivery paths 13,14 are shown, it will be understood that the fiber placement head may have 8, 16, 32, or any other number of redirect rollers and material delivery paths or lanes, depending on the design of the head. A clamp and restart mechanism 24 is provided for each fiber path 13 and 14. The clamp and restart mechanism 24 comprises opposed pinch rollers 25 and restart rollers 27 for driving the fiber to the compaction roller 16. Cutters 26 are positioned adjacent the end of the head for cutting the fiber to the desired length. The cutters 26 are driven by actuators 28 that operate through a linkage mechanism 30 as well known in the art. Clamp feet 29 are actuated by clamp cylinders 31 to clamp the fiber after it has been cut.

The compaction roller 16 is mounted in a fiber laminating pressure tip assembly 32 that is mounted on rails 40 (only one shown) to the fiber placement head, and is able to shift from one side of the centerline 18 to the other in order to apply fiber to the application surface 23 while traveling in opposite directions. Tow fingers 38 are provided to guide the fiber 21 into contact with the surface of the compaction roller 16 after the fiber has been cut and when the head is starting to lay a new course. The tow fingers 38 are positioned on both sides of the compaction roller 16 but are actuated to only brush against the compaction roller 16 on the side of the roller that is receiving tow from the clamp and restart mechanism 24 as explained more fully below.

Figure 2:
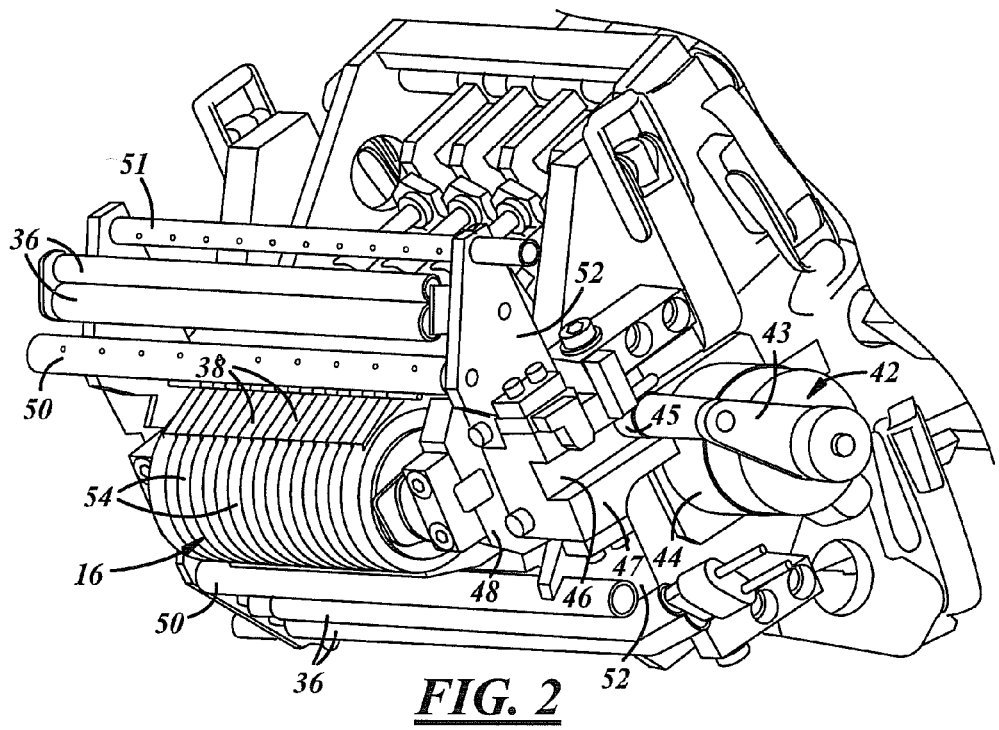
FIG. 2 is a perspective view of the face of a fiber placement head showing the mechanism for shifting the compaction roller from one position on the head to the other.

FIG. 2 is a perspective view of the face of a fiber placement head showing the compaction roller 16 and the shifting mechanism 42 for shifting the compaction roller from one position on the head to the other. The shifting mechanism 42 comprises a lever arm 43 mounted on a rotary actuator 44, and a roller cam 45 mounted on the end of the lever arm engages a slot 46 in a shift plate 47. The shift plate 47 is mounted on a bracket 48 that supports the compaction roller 16. A similar shifting mechanism, shift plate and bracket support are located on the other end of the compaction roller 16. The rotary actuator 44 rotates the lever arm 43 to shift the compaction roller 16 from one position on the fiber placement head to another as explained in detail below in connection with FIGS. 3-6. Infrared heating tubes 36 and air cooling tubes 50 and 51 are mounted on outrigger brackets 52 that are attached to the shift plate 47 on either side of the compaction roller 16 and move laterally with the compaction roller 16. The infrared heating tubes 36 and air cooling tubes 50 and 51 are turned on or off depending on the direction of travel of the head on the application surface. As shown, the compaction roller 16 comprises side-by-side roller assemblies 54 that are mounted for independent motion relative to one another in order to allow the compaction roller to conform to an application surface that is not flat. Such compaction roller assemblies are well known in the art.

Figure 3:
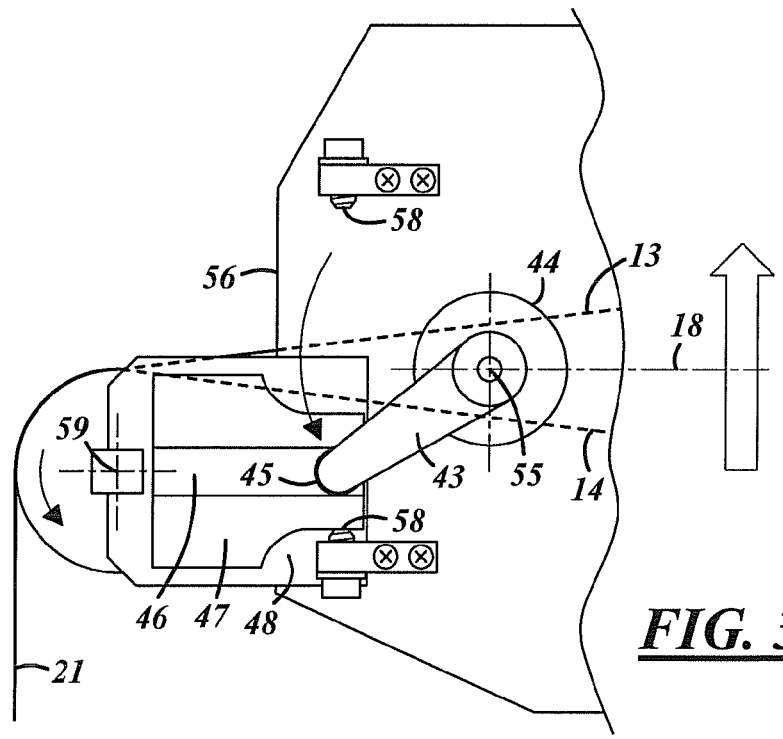
FIGS. 3 and 4 are simplified views showing the mechanism for shifting the compaction roller on a fiber placement head.
Figure 4:
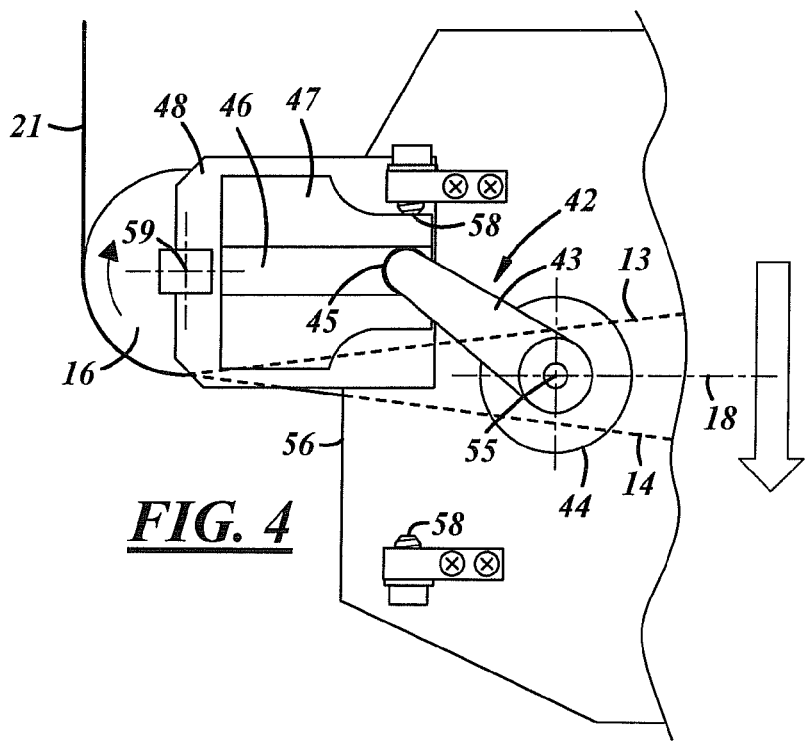

FIGS. 3 and 4 show rotation of the lever arm 43 about the axis 55 of the rotary actuator 44 and the resulting movement of the compaction roller 16 from one position to the other on the end 56 of the fiber placement head. The rotary actuator 44 rotates the lever aim 43 and the roller cam 45 in an arc, moving the shift plate 47 and the bracket 48 to move the compaction roller 16 relative to the centerline 18 of the head. The rotary actuator 44 may comprise a dual port rotary air cylinder and may provide a locking feature for the position of the lever arm 43 by virtue of maintained air pressure to either port. External adjustable stops 58 may be provided to stop rotation of the cylinder 44 in either direction by limiting the travel of shift plate 47 without bottoming out the rotary cylinder stroke.

Figure 6:
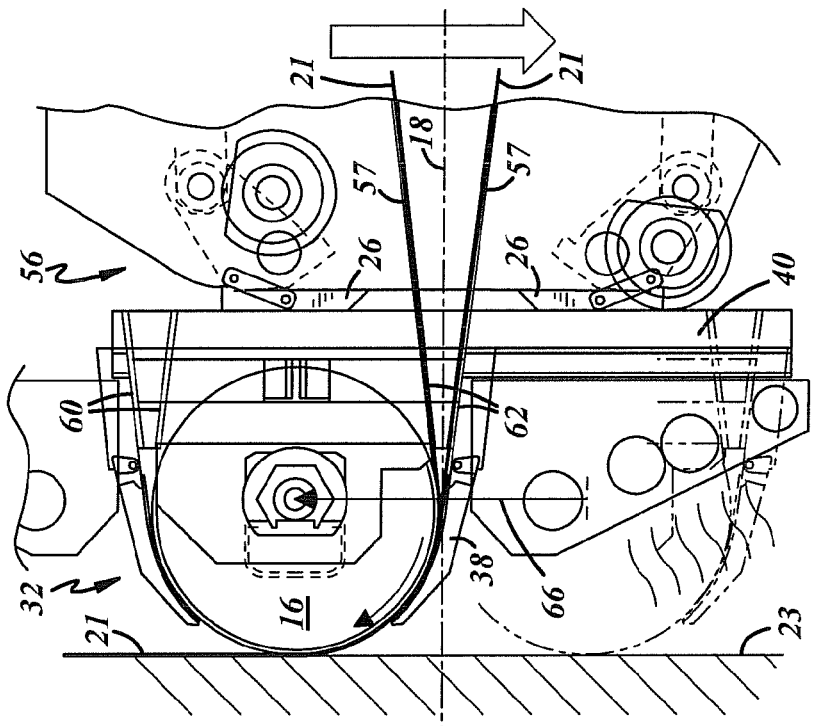
FIG. 6 is a side view of the end of a fiber placement head showing the fiber path with the compaction roller in position to apply fiber to an application surface while moving downward.
Figure 5:
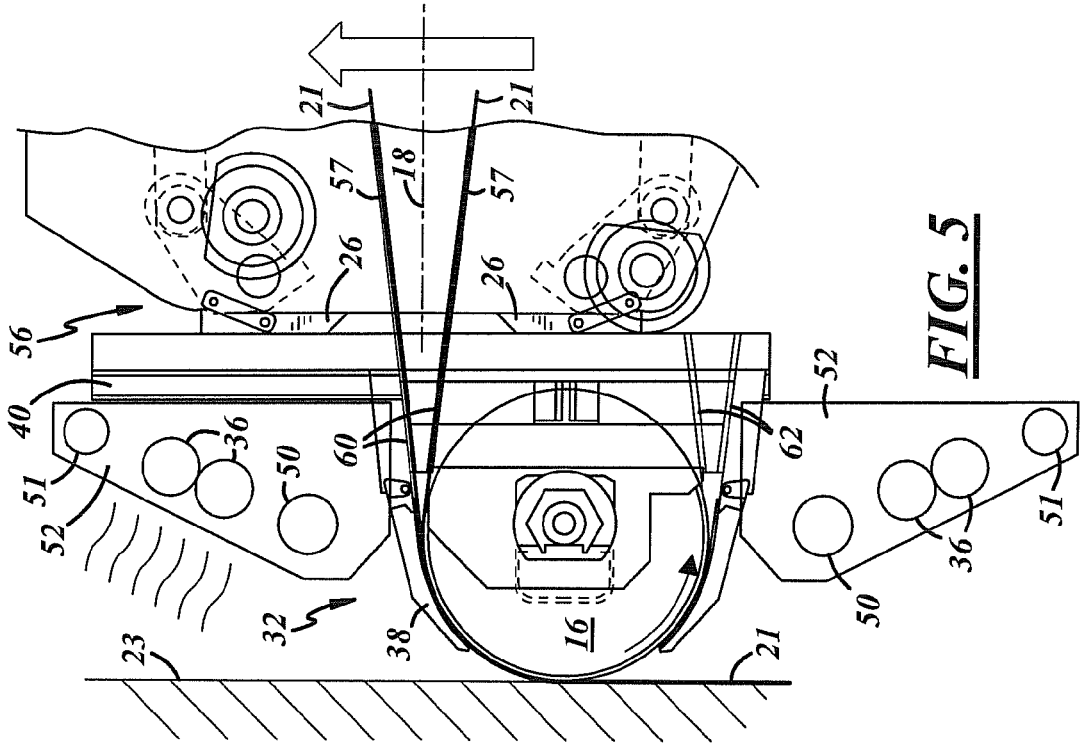
FIG. 5 is a side view of the end of a fiber placement head showing the fiber path with the compaction roller in position to apply fiber to an application surface while moving upward.

FIGS. 5 and 6 are detail views of a compaction roller 16 in position to apply fiber 21 to an application surface 23 while moving upward and downward, respectively. The pressure tip assembly 32 can shuttle linearly across the face 56 of the fiber placement head on parallel rails 40, best seen in FIG. 7, to position the compaction roller 16 first on one side of the centerline 18 for fiber placement in one direction, and then on the other side of the centerline 18 for fiber placement in the opposite direction. Two pairs of lower guide chutes 60 and 62 are mounted on either side of the compaction roller 16 for directing the fiber into contact with one side or the other of the compaction roller. The first pair of lower guide chutes 60 is provided for receiving the fiber as shown in FIG. 5 when the roller 16 is in the position shown and rotating counterclockwise to apply fiber 21 to the application surface 23 while travelling in an upward direction. The second pair of lower guide chutes 62 is provided for receiving the fiber 21 as shown in FIG. 6 when the roller 16 is in the position shown and rotating clockwise to apply fiber 21 to the application surface 23 while travelling in a downward direction. As the fiber 21 emerges from the lower guide chutes 60,62, it comes into contact with the tow fingers 38 that direct the fiber into contact with the side of the compaction roller 16. As the compaction roller 16 begins to rotate against the application surface 23, the fiber 21 is fed by the restart rollers 27 along the surface of the compaction roller until it is in contact with the application surface 23. Further rotation of the compaction roller 16 along the application surface 23 causes the fiber 21 to be applied to the surface in a manner well known in the art.

FIG. 5 shows the pressure tip assembly 32 positioned so that the compaction roller 16 can apply fiber 21 to the surface 23 when moving in an upward direction. The compaction roller 16 rotates in the counterclockwise direction as the roller applies fiber to the application surface 23. Heating lamps 36 and cooling tubes 50,51 are mounted on outrigger brackets 52 on either side of the compaction roller, and are active or inactive depending on the direction of travel of the compaction roller 16 on the application surface. The heating lamps 36 heat the surface 23 ahead of the compaction roller 16 to improve the adherence of the fiber as it is applied to the surface. The lower cooling tube 50 blows ambient air onto the application surface 23 in the event that the head experiences an emergency stop in the middle of a course. The upper cooling tube 51 blows ambient air onto the infrared bulbs 36 to quench the radiant heat emitted from the bulb when the head is in a stop position. When the head is moving upward as shown in FIG. 5, the heating lamps 36 above the compaction roller 16 are active, and heating lamps 36 and cooling tubes 50,51 that are below the compaction roller are inactive. When the head is traveling in the downward as shown in FIG. 6, the heating lamps 36 below the compaction roller 16 are active, and the heating lamps 36 and cooling tubes 50,51 above the compaction roller 16 are inactive.

Figure 7:
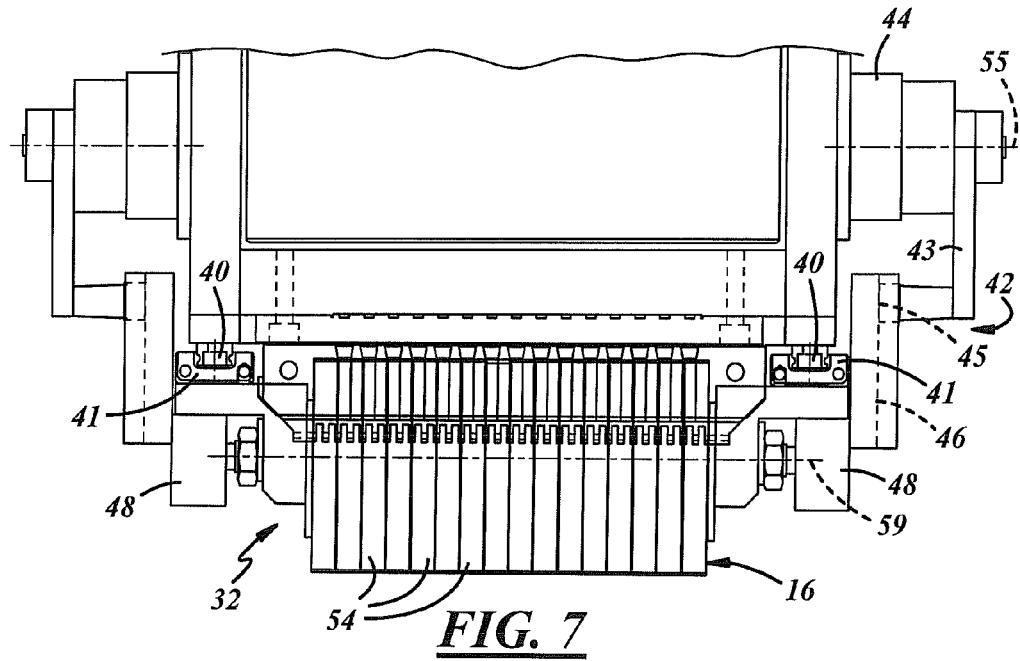
FIG. 7 shows the sliding mount mechanism for the compaction roller on the face of a fiber placement head.

FIG. 7 shows the sliding mount mechanism for the pressure tip assembly 32. The compaction roller 16 is supported on either end by a pair of brackets 48 and is mounted to rotate about an axis 59. The brackets 48 are supported on either side by bearings 41 that slideably engage a pair of parallel rails 40 that are mounted on the face of the head. The position of the brackets 48 is shifted on the rails 40 by the shift mechanism 42 as explained in connection with FIGS. 2-4.

The compaction roller's two positions shown in FIGS. 3-4 and 5-6 are symmetric about the head centerline 18 allowing identical fiber path dispensing through the head 10 when the compactor roller 16 is positioned for dispensing in either of the two opposite dispensing directions. The fiber delivery system within the fiber placement head 10 is simplified since reversing the direction of travel of the head does not alter the length or orientation of the individual fiber paths 13,14 from the redirect rollers 20 to the compaction roller 16. There is no overall band twisting as the head reverses its direction of travel since the head always remains in the same orientation relative to the application surface 23.

In operation, with the compaction roller 16 in contact with the application surface 23 as shown in FIG. 5, the head moves upward and the compaction roller 16 rotates counterclockwise to apply fiber 21 from the lower chutes 60 to the application surface until it reaches the end of a course. As the head approaches the end of a course, the fiber tows are cut by the cutters 26, the clamp feet 29 clamp the fiber in the head, the head lifts off the surface without rotating 180°, and the pressure tip assembly 32 shifts from the position shown in FIG. 5 to the position shown in FIG. 6. This shifts the compaction roller along a linear path 66 that is parallel to a plane that is normal to the centerline 18 of the head. The clamp feet 29 then release the fiber, the pinch and restart rollers, 25 and 27, respectively, drive the fiber through the head chutes 57 and lower chutes 60,62, and the tow fingers 38 guide the fiber along the outer circumference of the compaction roller 16 until the fiber reaches the point on the compaction roller that is parallel to the application surface. The tow fingers 38 on the side of the compaction roller that is not receiving tow from the lower chutes 60,62 may be retracted from contact with the compaction roller to avoid interfering with the rotation of the compaction roller and prevent transfer of any resin that may be on the roller to the tow fingers. The head then lowers the compaction roller 16 into contact with the application surface 23 and begins applying fiber 21 to the surface with the compaction roller rotating in the clockwise direction. In so doing, the opposite face of the fiber material is applied to the application surface 23. When the head reaches the end of the application surface, the fiber 21 is cut, the head lifts off of the application surface 23, and the process repeats.

Although the entire fiber placement machine for use with the head described above has not been shown or described, the fiber placement head can be used with large, medium or small tilt cross feed fiber placement machines, gantry fiber placement machines with a vertical fiber placement head, a vertical head cross feed fiber placement machine, a traveling fiber placement machine with a horizontal/vertical head, an articulated arm robot fiber placement machine, or an internal fiber placement machine.

These and other modifications and alterations of the device will be apparent to those skilled in the art, which modifications and alterations will be within the scope of the in invention as defined by the appended claims.

The invention claimed is:

1. A reversing fiber placement head capable of bidirectional fiber placement on an application surface, the head comprising:
   a feed mechanism for delivering fiber along two feed paths, the two feed paths being in a V-shaped orientation relative to one another;
   a pressure tip assembly for receiving fiber from the two feed paths and applying the fiber to an application surface;
   a cutting mechanism between the feed mechanism and the pressure tip assembly for cutting the fiber to the desired length;
   a compaction roller mounted on the pressure tip assembly; and,
   a shifting mechanism for shifting the pressure tip assembly in a straight line along a linear path from a first position on the fiber placement head to a second position on the fiber placement head, whereby the compaction roller changes its direction of rotation in order to apply fiber to the application surface in opposite directions.

2. The reversing fiber placement head of claim 1 further comprising:
   the fiber placement head having a centerline that is perpendicular to the application surface; and,
   the two feed paths being symmetrically disposed on either side of the centerline, whereby the shifting mechanism shifts the compaction roller laterally from one side of the centerline to the other in order to apply fiber to the application surface in opposite directions, and whereby the compaction roller moves along a path that is parallel to a plane that is normal to the centerline of the head.

3. The reversing fiber placement head of claim 2 further comprising:
   a redirect roller in each feed path remote from the compaction roller,
   each feed path being a straight line through the fiber placement head from the redirect rollers to the compaction roller.

4. The reversing fiber placement head of claim 3 wherein the length and orientation of the feed paths are unchanged by shifting the compaction roller from one side of the centerline to the other side of the centerline.

5. The reversing fiber placement head of claim 2 further comprising:
   at least one rail supporting the pressure tip assembly on the fiber placement head, the at least one rail allowing the shifting movement of the pressure tip assembly relative to the centerline of the fiber placement head.

6. The reversing fiber placement head of claim 2 further comprising:
   a rotary actuator mounted on the fiber placement head;
   a lever arm mounted on the rotary actuator; and,
   a shift plate mounted on the pressure tip assembly, whereby the motion of the rotary actuator causes the lever arm to act on the shift plate to shift the pressure tip assembly laterally from one position on the fiber placement head to another position.

7. The reversing fiber placement head of claim 2 further comprising:
   heating tubes on both sides of the compaction roller, the heating tubes allowing the compaction roller to apply fiber to an application surface while traveling in opposite directions.

8. The reversing fiber placement head of claim 5 further comprising:
   a pair of rails supporting the pressure tip assembly.

9. The reversing fiber placement head of claim 6 further comprising:
   an adjustable stop for the stop position of the pressure tip assembly.

10. The reversing fiber placement head of claim 1 further comprising:
    two pairs of lower guide chutes in the pressure tip assembly, whereby a first pair of lower guide chutes receives fiber from the feed paths when the pressure tip assembly is in a first position, and whereby a second pair of lower guide chutes receives fiber from the feed paths when the pressure tip assembly is in a second position.

11. The reversing fiber placement head of claim 1 further comprising:
    two pairs of lower guide chutes in the pressure tip assembly, whereby a first pair of lower guide chutes receives fiber from the feed paths when the compaction roller is rotating against the application surface in a counter-clockwise direction, and whereby a second pair of lower guide chutes receives fiber from the feed paths when the compaction roller is rotating against the application surface in a clockwise direction.

* * * * *